UNITED STATES PATENT OFFICE.

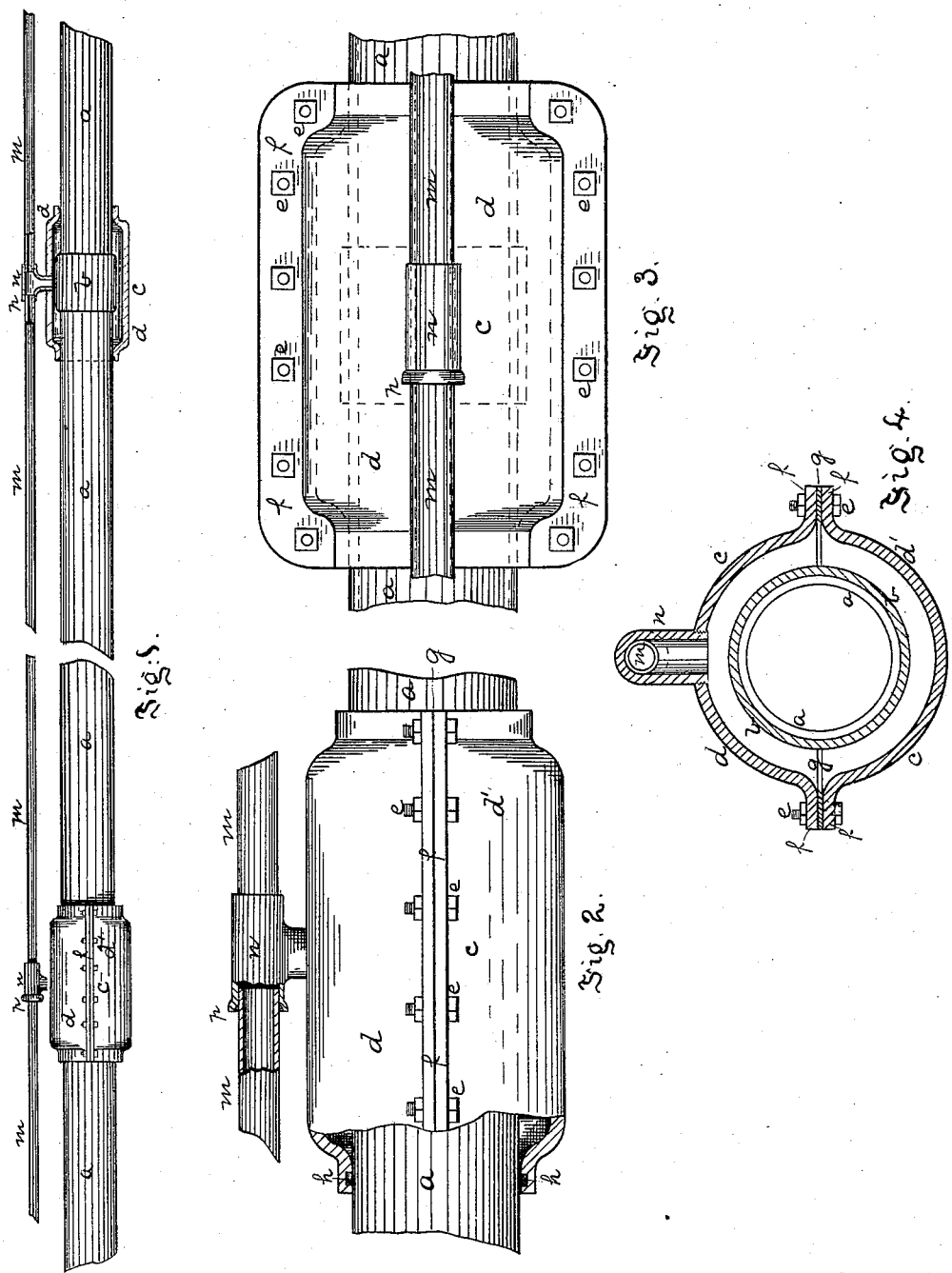

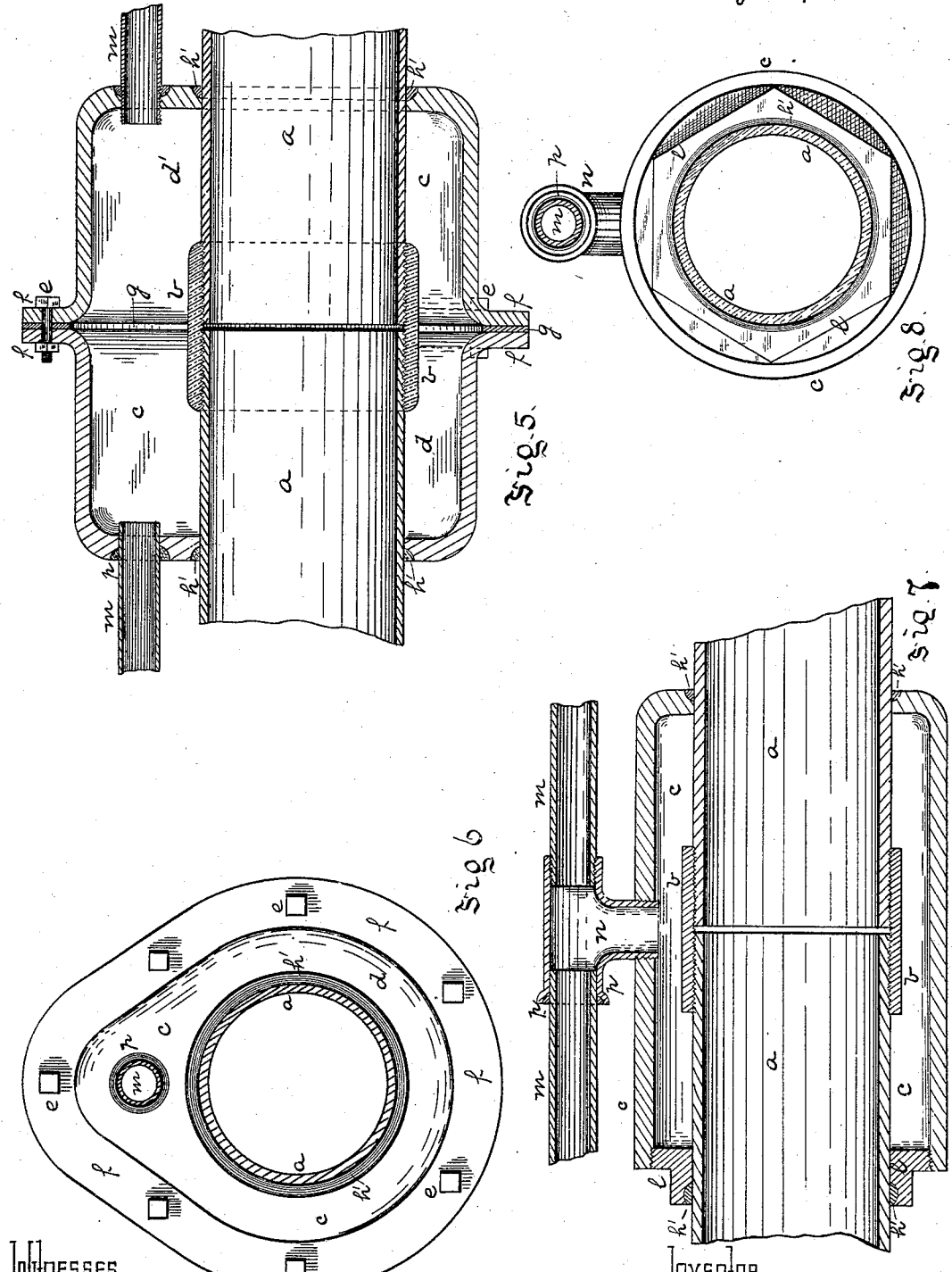

MORRIS S. VERNER, OF PITTSBURG, PENNSYLVANIA, ASSIGNOR TO GEORGE WESTINGHOUSE, JR., OF SAME PLACE.

PIPE JOINT AND LINE.

SPECIFICATION forming part of Letters Patent No. 345,463, dated July 13, 1886.

Application filed August 6, 1884. Serial No. 139,728. (No model.)

*To all whom it may concern:*

Be it known that I, MORRIS S. VERNER, of Pittsburg, in the county of Allegheny and State of Pennsylvania, have invented certain new and useful Improvements in Pipe Joints and Lines, of which improvements the following is a specification.

My invention relates to pipe joints and lines for conducting liquids and gases, and more particularly to those used for conveying natural gas. This gas, which is employed for lighting and heating purposes, is carried in underground pipe-lines or conduits from the wells where it is obtained to the desired points of utilization, the conduits best adapted for that purpose being metal tubes or pipes connected by suitable couplings. The gas being exceedingly rare, the ordinary threaded couplings are not sufficiently tight to prevent its escape, and where it is carried in pipe-lines through streets of cities at high pressure its tendency to leak through the couplings and escape through the ground or into the cellars of buildings, and thereby cause explosions, is a source of danger which it is of special importance to guard against. The gas being almost odorless, the detection of leakage before it has attained a dangerous degree is difficult.

A form of conduit heretofore devised for the conveyance of natural gas is set forth in Letters Patent of the United States No. 301,191, granted to George Westinghouse, Jr., July 1, 1884. In such construction the main or pipe line, in which the gas is carried at high pressure, is inclosed within a larger or low-pressure line, so that the gas which escapes at the smaller or high-pressure main may be retained within the larger main or compartment, and by means of suitable valve-connections with the smaller main the pressure in the larger main may be increased as desired, the ends of the compartments thereof being connected by pipes, if necessary. Inasmuch as but a low pressure is required for dwelling-houses, the connections thereto are made from the low pressure or outer pipe. The pressure in said pipe being comparatively low, the ordinary joints, when properly made, will suffice to prevent the escape of gas therefrom; but the outer pipe prevents access to the inclosed high-pressure main, except at long intervals, where the latter is exposed between the compartments formed by the inclosing low-pressure main, and for an ordinary line the latter will require to be ten or twelve inches in diameter and upward, and therefore involves considerable cost in the construction of such a line.

The object of my invention is to provide an efficient and inexpensive pipe-joint and conduit, whereby the escape of gas from a high-pressure main into the ground may be prevented, and, if desired, the gas leaking from the joints of the high-pressure main may be retained in a small low-pressure main for utilization where a low-pressure is required, or be permitted to escape into the air at suitable determined points, while direct connections may be made with the high-pressure main at all points along the conduit.

To this end my invention, generally stated, consists in the combination, with a main-pipe line, of a gas-tight chamber surrounding a single joint of said line, and a vent-pipe leading out of said chamber, and also in the combination, with a main-pipe line, of a series of such chambers, each surrounding a joint of the line, and a supplemental pipe-line formed of sections of tubing communicating with the chambers surrounding the joints, thus constituting a low-pressure line, from which connections can be made for any desired purpose, or from which gas may be allowed to escape at determined points.

In the accompanying drawings, Figure 1 is a side view, partly in section, illustrating the application of my invention; Fig. 2, a side view, partly in section and on an enlarged scale, of one of the chambers surrounding the joints; Fig. 3, a plan or top view of the same; Fig. 4, a vertical transverse central section through the same. Fig. 5 is a longitudinal central section; Fig. 6, an end view of a modified form of joint-chamber; Fig. 7, a longitudinal central section, and Fig. 8 an end view showing another form of chamber.

The main pipe-line is formed of metal pipes or tubing *a*, the several sections being coupled by threaded or other suitable couplings, *b*, each of which is surrounded and inclosed by a chamber, c, which fits closely around the tubing, so as to make a tight joint therewith adjacent to each end of the coupling.

The chambers c are preferably formed of cast metal, and may be secured around the tubing in different ways, three forms of chambers being illustrated in the drawings. The form preferred by me is illustrated in Figs. 2, 3, and 4, as it may be employed with any pipe-line previously laid without disturbing the joints or coupling, the chamber being divided longitudinally into two parts or halves, $d\ d'$, and the parts being secured together by means of bolts $e$, passing through the flanges $f$. In order to form a gas-tight joint between the parts, lead or other suitable packing, $g$, is inserted between the flanges $f$. The ends of the chamber are contracted and fit neatly around the tubing, and the joints between the chamber and the tubing may be packed by means of lead packing fitting in seats, as at $h$, and compressed against the tubing when the chamber is secured around it, or suitable calking-recesses, $h'$, may be formed in the ends of the chamber around the tubing, which recesses are filled and calked with lead or other calking material after the chamber is secured in place. The chamber is secured in place after the joint or coupling is made in the pipe-line, and hence can be employed with lines previously laid.

The chamber $c$ (shown in Figs. 5 and 6) is divided transversely into two parts, $d\ d'$, the parts having the flanges $f$ extending around them, and being connected by the bolts $e$, passing through the flanges, and packed by means of a gasket, $g$, between the flanges. The parts of this chamber must be slipped over the tubing before the coupling is made, and after the pipes are connected the parts are secured together, the ends of the chamber being then packed by calking poured into annular recesses $h'$, as before referred to, or in other suitable manner.

The main body of the chamber (shown in Figs. 7 and 8) is formed in one piece, and one end thereof is closed by a threaded bushing or cap, $l$, which is screwed into the chamber, the parts being slipped onto the tubing before the coupling is made and afterward screwed together, and the parts being subsequently packed around the tubing. If desired, this chamber may be formed of a short section of wrought-metal pipe, and both ends closed up by bushings or caps.

The chambers $c$ of the several joints of the main line are connected by a series of pipes, $m$, which lead from chamber to chamber along the line and form an auxiliary or low-pressure main, with which the pipes supplying dwelling-houses and other places requiring only a low pressure of gas may be connected, or from which at suitable intervals pipes may be led to points above the surface of the ground to allow the escape of gas. The supplemental pipe-line $m$ is preferably formed of small tubing, two-inch pipe ordinarily sufficing, and may be connected to the chambers $c$ either through the intermediation of T-joints $n$, as shown in Figs. 1 to 4 and 7 and 8, or be directly connected to the chambers, as in Figs. 5 and 6. As the chambers $c$ and supplemental pipe-line $m$ are secured in place after the main line is laid, one or both of the joints of the pipes $m$, with the chambers or their T-joints, are made in the form of expansion joints, so that the pipes will slide within the joints as the parts of the chamber are brought together, or as the other end of the pipe $m$ is screwed into the chamber or its T-joint. These sliding joints are illustrated at $p$, and any desired form of expansion-joint may be employed for the purpose, the joints having the further advantage that they allow of the expansion and contraction of the chambers $c$ and pipe-lines $m$.

In the operation of my improved pipe line and joint, the gas passes from the gas-well into the pipe-line $a$ at the high pressure at which it escapes from the well, and, as it is almost impossible to hold the gas at this pressure by means of the couplings $b$, it escapes into the chambers $c$ around the joints. Where the pipes leading from the chambers are only employed to carry away the gas and burn it, as above referred to, there is comparatively no pressure within the chambers, the gas escaping at the joints rising through the pipes to the point of ignition or escape. Where the chambers communicate with gas holders or reservoirs through the supplemental pipe-line, though the pressure may be heavy in the main line, the gas escaping induces only a low pressure—say not over three or four pounds—in the reservoirs or supplemental line, and at this low pressure the ordinary joints, threaded or calked, are tight enough to prevent any leakage whatever of the gas. As all the chambers $c$ communicate with the supplemental pipe-line $m$, a substantially uniform pressure is maintained therein, whether all the joints leak or only some of them, and the chambers around the joints form reservoirs to store the gas at low pressure. In case sufficient gas does not escape into the supplemental line, suitable valve-connections may be arranged between the two lines to maintain the required pressure therein. As the two lines are separate, connection may be made with either line without disturbing the other line, thus overcoming a very great objection found where the high-pressure line is inclosed within the low-pressure line; and as the cost of the smaller low-pressure line is not more than one-twentieth that of the larger pipe suitable for inclosing the high-pressure line, the cost of my improved low-pressure or supplemental line is materially less than that of the larger pipe-line.

The chambers $c$ may be employed in the manner described around all joints on the high-pressure line, the chambers conforming in shape to the joints made and any operating-shafts extending through the chambers.

Where it is desired to repair any joint of the main line, the chamber can be opened and moved without disturbing the auxiliary line, as it can be moved back over the tubing of the main line and the auxiliary line on account of the packed sliding joints.

An additional advantageous result is attained in the employment of my invention by the prevention of escape of gas from the main pipe-line in the event of breakage thereof at a joint. It is well known that the weakest portions of a line are at the threaded ends, to which the coupling-sockets are connected, and by the provision of chambers, which wholly inclose the joints of the line and abut against the pipe-sections beyond the portions thereof at which their connection is made, gas escaping at a ruptured joint is received by its inclosing-chamber and carried off therefrom by the vent-pipe.

In the following claims I use the word "separate" to mean that each chamber is limited to a single joint, and the word "independent" to mean that each chamber is detachable from and external to the coupling, joint, or section of pipe to which it is applied.

I claim herein as my invention—

1. The combination of a pipe-line composed of sections of pipe connected at the joints by couplings, with a separate gas-tight chamber surrounding a single joint thereof adapted to receive any leakage therefrom, and a vent-pipe leading from such chamber, substantially as and for the purpose set forth.

2. In combination with a main pipe-line composed of sections of pipe connected at the joints by couplings, independent gas-tight chambers inclosing, respectively, single joints thereof, and a vent pipe or pipes leading from such chambers, substantially as and for the purpose set forth.

3. In combination with a main pipe-line, a series of independent chambers, each inclosing a single joint thereof, and a supplemental pipe-line running parallel to the main line and at one side thereof and in communication with said chambers, substantially as set forth.

4. In combination with a main pipe-line formed of sections of tubing connected by joints or couplings, chambers surrounding the joints, and a supplemental pipe-line formed of sections of tubing communicating with said chambers by means of one or more sliding joints, substantially as set forth.

5. A chamber longitudinally divided in sections, and provided with flanges and inclosing a joint of a gas-main, whereby the sections may be fastened together by means of bolts, packing interposed between the flanges of the sections and between the contracted ends of the sections and the main, and a vent-pipe, all combined and operating substantially as set forth.

In testimony whereof I, the said MORRIS S. VERNER, have hereunto set my hand.

MORRIS S. VERNER.

Witnesses:
  WM. B. KIRKER,
  F. G. KAY.